United States Patent
Takaki

(10) Patent No.: US 9,131,443 B2
(45) Date of Patent: Sep. 8, 2015

(54) PORTABLE TERMINAL AND COMMUNICATION CONTROL METHOD

(75) Inventor: Tetsuya Takaki, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 195 days.

(21) Appl. No.: 13/881,306

(22) PCT Filed: Oct. 27, 2011

(86) PCT No.: PCT/JP2011/074775
§ 371 (c)(1),
(2), (4) Date: Apr. 24, 2013

(87) PCT Pub. No.: WO2012/063648
PCT Pub. Date: May 18, 2012

(65) Prior Publication Data
US 2013/0235777 A1 Sep. 12, 2013

(30) Foreign Application Priority Data
Nov. 10, 2010 (JP) ................................ 2010-251681

(51) Int. Cl.
*H04W 52/02* (2009.01)
(52) U.S. Cl.
CPC ........ *H04W 52/0225* (2013.01); *H04W 52/027* (2013.01); *H04W 52/0209* (2013.01); *H04W 52/0251* (2013.01); *Y02B 60/50* (2013.01)
(58) Field of Classification Search
USPC .................... 370/311; 455/566, 574; 715/867
See application file for complete search history.

(56) References Cited

U.S. PATENT DOCUMENTS

| 6,219,021 B1 | 4/2001 | Izumi |
| 2001/0006390 A1 | 7/2001 | Tanabe |
| 2005/0192063 A1* | 9/2005 | Brubacher-Cressman et al. ............................ 455/574 |
| 2009/0106800 A1 | 4/2009 | Eade et al. |
| 2009/0158221 A1* | 6/2009 | Nielsen et al. ................. 715/867 |
| 2009/0161587 A1 | 6/2009 | Ishii et al. |
| 2012/0094722 A1* | 4/2012 | Kim .............................. 455/566 |

FOREIGN PATENT DOCUMENTS

| CN | 1731874 A | 2/2006 |
| CN | 1953587 A | 4/2007 |
| JP | 11-102173 A | 4/1999 |
| JP | 11-313370 A | 11/1999 |
| JP | 2001-186250 A | 7/2001 |
| JP | 2002-183600 A | 6/2002 |
| JP | 2005-229536 A | 8/2005 |
| JP | 2008-148174 A | 6/2008 |

(Continued)

OTHER PUBLICATIONS

Communication dated Jun. 4, 2014, issued by the European Patent Office in corresponding Application No. 11839914.6.

(Continued)

*Primary Examiner* — Vinncelas Louis
(74) *Attorney, Agent, or Firm* — Sughrue Mion, PLLC

(57) ABSTRACT

A mobile terminal according to the present invention includes data analyzer analyzing content that makes up a web page received from a server connected to a network via a base station, display unit displaying the web page, and channel transition controller adjusting the timing to transit to a standby mode which consumes a smaller amount of electric power than in a present mode based on the result of the analysis made by the data analyzer.

8 Claims, 5 Drawing Sheets

(56) References Cited

FOREIGN PATENT DOCUMENTS

| JP | 2009-004981 A | 1/2009 |
|----|---------------|--------|
| JP | 2009-213175 A | 9/2009 |
| WO | 2004/019637 A1 | 3/2004 |

OTHER PUBLICATIONS

Office Action, dated Dec. 17, 2013, issued by the State Intellectual Property Office of the People's Republic of China, in counterpart Application No. 201180054335.6.

* cited by examiner

PORTABLE TERMINAL AND COMMUNICATION CONTROL METHOD

CROSS REFERENCE TO RELATED APPLICATIONS

This application is a National Stage of International Application No. PCT/JP2011/074775 filed Oct. 27, 2011, claiming priority based on Japanese Patent Application No. 2010-251681 filed Nov. 10, 2010, the contents of all of which are incorporated herein by reference in their entirety.

FIELD OF THE INVENTION

The present invention relates to a mobile terminal and a communication control method for performing packet communications via a base station.

BACKGROUND ART

Channel transitions that a mobile terminal makes when the mobile terminal performs packet communications with a base station will be described below. FIG. 1 is a diagram illustrative of channel transitions according to a relevant communication process. It is assumed that the communication process is based on W-CDMA (Wideband Code Division Multiple Access). W-CDMA is disclosed in WO2004/019637, for example. It is also assumed that a base station can be connected to a server that stores web pages through a mobile telephone network and the Internet.

When a mobile terminal completes its positional registration in a base station, the mobile terminal is brought into a standby mode waiting for an incoming call or an outgoing call while being kept idle with minimum electric power consumption. When the user operates the mobile terminal to enter a command to request a web page, the mobile terminal changes into a CELL-DCH (Dedicated Channel) mode wherein the mobile terminal starts packet communications with the base station and sends information representing a request for the web page to the base station. When the mobile terminal receives web page data from a server on the network via an individual channel assigned by the base station, the mobile terminal displays an image based on the web page data on its screen.

Thereafter, if no packet communications take place with the base station upon elapse of a certain time, then the mobile terminal releases individual channels and makes channel transitions in order to increase the frequency usage efficiency. Specifically, the mobile terminal makes channel transitions successively from a CELL-DCH mode to a CELL-FACH (Forward Access Channel) mode to a CELL-PCH (Paging Channel) mode finally to an IDLE mode. If packet communications take place while in the CELL-FACH mode, or CELL-PCH mode, or the IDLE mode, then the mobile terminal immediately makes a channel transition to the CELL-DCH mode.

As described above, the mobile terminal makes channel transitions successively from the CELL-DCH mode to the CELL-FACH mode to the CELL-PCH mode to the IDLE mode in order to increase the frequency usage efficiency. According to a communication sequence for establishing a call connection between the mobile terminal and the base station, the communication volume of control information is greater when the mobile terminal makes a channel transition from the IDLE mode to the CELL-DCH mode than when the mobile terminal makes a channel transition from the CELL-FACH mode or from the CELL-PCH mode to the CELL-DCH mode. In order to prevent the communication volume of control information from increasing when the mobile terminal resumes packet communications after having finished packet communications at one time, the mobile terminal is kept in the CELL-FACH mode or in the CELL-PCH mode for a certain time, so that the mobile terminal is kept on standby in readiness for resuming packet communications quickly.

In the CELL-FACH mode or the CELL-PCH mode, however, the mobile terminal consumes electric power to keep itself ready for packet communications though it actually does not perform packet communications. Recently, there has been proposed a method of controlling channel transitions called a Fast Dormancy function as communication specifications for 3GPP for the purpose of reducing electric power consumption.

FIG. 2 is a diagram illustrative of channel transitions at the time when the Fast Dormancy function is performed. The Fast Dormancy function causes a mobile terminal to make a channel transition from the CELL-DCH mode to the IDLE mode if no packet communications take place for a certain time after the mobile terminal has performed packet communications. According to the Fast Dormancy function, since the mobile terminal is not kept on standby temporarily in the CELL-DCH mode and the IDLE mode according to the channel transition control described with reference to FIG. 1, electric power consumption required to maintain the mobile terminal in packet communications is eliminated. The electric power consumption of the mobile terminal becomes progressively smaller in the order of the CELL-DCH mode, the CELL-PCH mode, and the IDLE mode.

SUMMARY OF THE INVENTION

According to the channel transition control shown in FIG. 2, when the mobile terminal acquires one web page, the Fast Dormancy function is automatically activated upon elapse of a certain time after packet communications for acquiring the web page have been finished. Immediately after the Fast Dormancy function is activated and the mobile terminal changes to the IDLE mode, when the user operates the mobile terminal to enter a command into the mobile terminal for acquiring another web page, the mobile terminal makes a channel transition from the IDLE mode to the CELL-DCH mode immediately after the mobile terminal has made a channel transition from the CELL-DCH mode to the IDLE mode, as shown in FIG. 2. Inasmuch as the communication volume of control information according to the communication sequence for establishing a call connection between the mobile terminal and the base station is greater when the mobile terminal makes a channel transition from the IDLE mode to the CELL-DCH mode than when the mobile terminal makes a channel transition from the CELL-FACH mode or from the CELL-PCH mode to the CELL-DCH mode, electric power consumption will be increased if such channel transitions are repeated frequently.

An exemplary object of the invention is to provide a mobile terminal and a communication control method which make it possible to reduce electric power consumption while maintaining frequency usage efficiency for communications between a base station and the mobile terminal.

A mobile terminal according to an exemplary aspect of the invention includes a data analyzer analyzing content that makes up a web page received from a server connected to a network via a base station, a display unit displaying the web page, and a channel transition controller adjusting the timing to transit to a standby mode which consumes a smaller amount of electric power than in a present mode based on the result of the analysis made by the data analyzer.

A communication control method according to an exemplary aspect of the invention, to be performed by a controller of a mobile terminal which includes a display unit, an operation unit, and the controller, includes the controller analyzing content that makes up a web page received from a server connected to a network via a base station, and the controller adjusting the timing to transit to a standby mode which consumes a smaller amount of electric power than in a present mode based on the result of the analysis made by the controller.

FIRST EXEMPLARY EMBODIMENT

Figure 1:
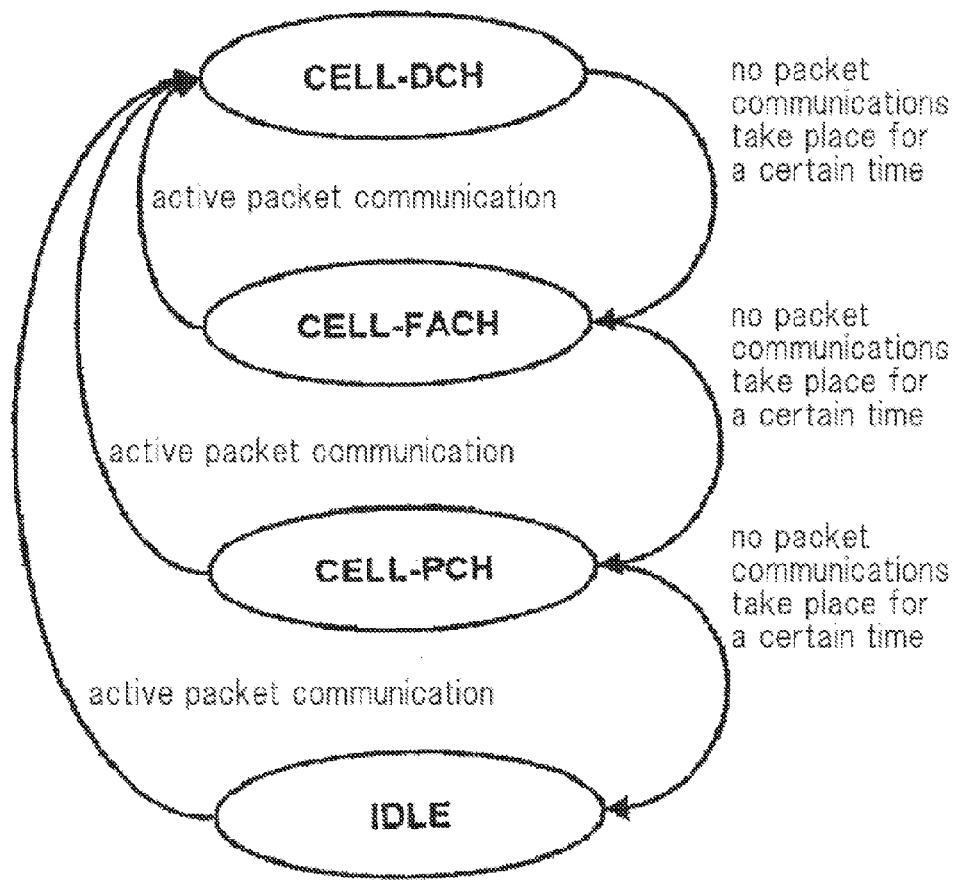
FIG. 1 is a diagram illustrative of channel transitions according to a relevant communication process.
Figure 2:
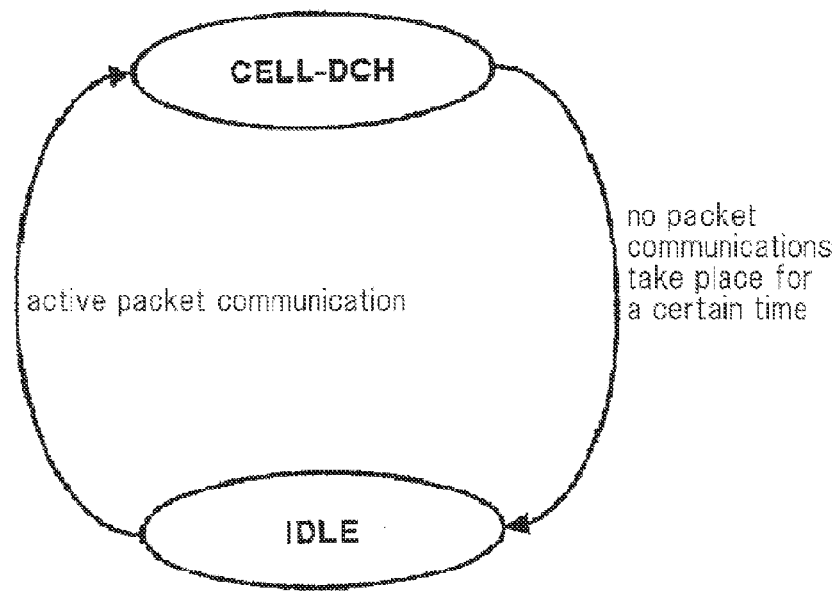
FIG. 2 is a diagram illustrative of channel transitions at the time when the Fast Dormancy function is performed.
Figure 3:
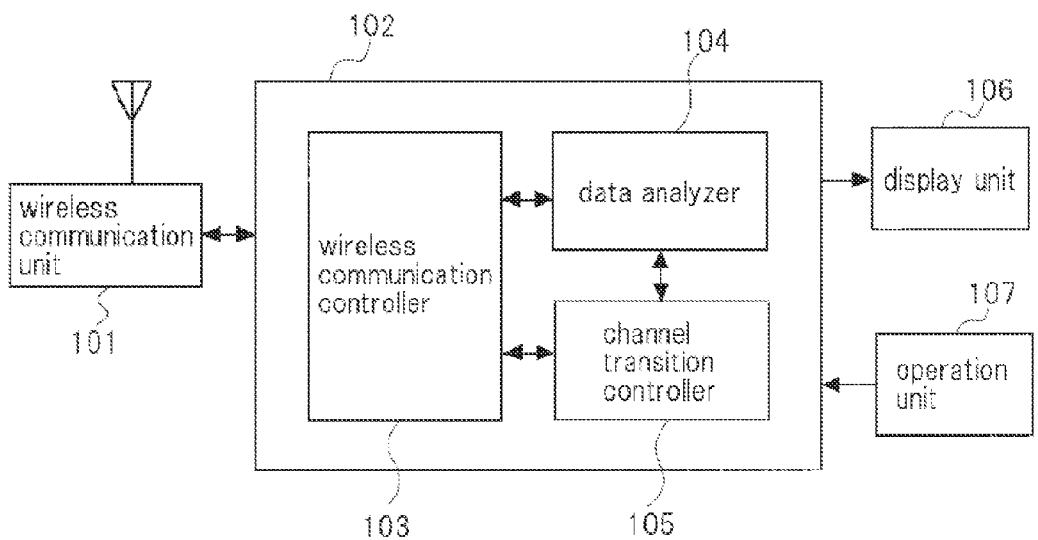
FIG. 3 is a block diagram showing a configurational example of a mobile terminal according to a first exemplary embodiment of the present invention.

The configuration of a mobile terminal according to the present exemplary embodiment will be described below. FIG. 3 is a block diagram showing a configurational example of a mobile terminal according to the present exemplary embodiment. According to the present exemplary embodiment, configurational and operational details about a communication control method as a feature of the present invention will be described below, whereas the packet communication function of an ordinary mobile terminal will not be described in detail below.

As shown in FIG. 3, the mobile terminal has wireless communication unit 101, display unit 106, operation unit 107, and controller 102 for controlling these units. Controller 102 includes wireless communication controller 103, data analyzer 104, and channel transition controller 105. As shown in FIG. 3, controller 102 is connected to wireless communication unit 101, display unit 106, and operation unit 107.

Wireless communication unit 101 performs wireless communications with a base station (not shown) under the control of wireless communication controller 103. Data analyzer 104 analyzes content that makes up a web page based on web page data received from a server on the network via the base station. Channel transition controller 105 determines information about a standby time during which the CELL-DCH mode is to be maintained, depending on the result of the analysis of the web page which has been made by data analyzer 104, and sends the determined information to wireless communication controller 103 for thereby adjusting the timing to change to the IDLE mode.

When wireless communication unit 101 receives web page data, wireless communication controller 103 activates a timer. Upon elapse of a preset reference standby time, wireless communication controller 103 activates the Fast Dormancy function to bring wireless communication unit 101 into the IDLE mode. When wireless communication controller 103 receives the information about the standby time from channel transition controller 105, wireless communication controller 103 controls the timing to activate the Fast Dormancy function based on the received standby time, rather than the reference standby time.

Display unit 106 is a man-machine interface for displaying not only images based on web page data received from the base station, but also images based on various application programs executed by the mobile terminal, states of the mobile terminal when it is in a standby mode and a communication mode, times, and received radio-wave intensities.

Operation unit 107 has character entry buttons for entering numerals and characters into the mobile terminal and command entry buttons for entering given commands into the mobile terminal. Operation unit 107 is also a man-machine interface as with display unit 106.

Data analyzer 104 and channel transition controller 105 comprise dedicated circuits for performing respective functions thereof. However, controller 102 may have a memory (not shown) for storing programs and a CPU (Central Processing Unit) (not shown), and the CPU may run the programs to virtually realize data analyzer 104 and channel transition controller 105. Alternatively, some functions of data analyzer 104 and channel transition controller 105 may be virtually realized by the CPU when it runs the programs.

Figure 4:
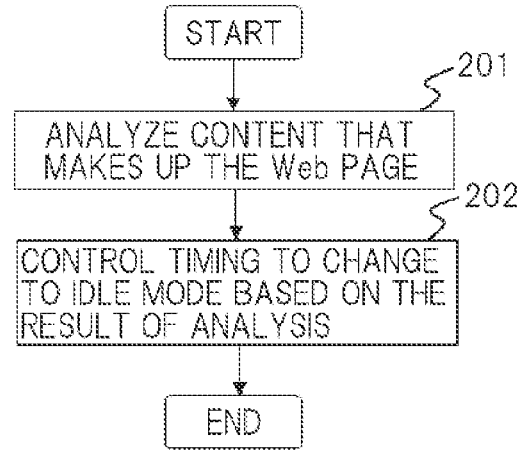
FIG. 4 is a flowchart of an operation sequence of the mobile terminal shown in FIG. 3.

Operation of the mobile terminal according to the present exemplary embodiment will be described below. FIG. 4 is a flowchart of an operation sequence of the mobile terminal according to the present exemplary embodiment.

The user operates operation unit 107 to enter a command into the mobile terminal for requesting a web page. The mobile terminal then starts packet communications with the base station, and display unit 106 displays information indicating that the mobile terminal is performing packet communications. The mobile terminal exchanges control information according to a communication sequence with the base station to establish a packet call, and sends a signal for requesting web page data to a server (not shown) connected to the network.

When controller 102 receives web page data representing one page from the base station via wireless communication unit 101, controller 102 displays a web page based on the received web page data on display unit 106, and data analyzer 104 analyzes content that makes up the web page (step 201).

The content that makes up the web page represents, for example, a page length indicating the length of the web page displayed on display unit 106, and information as to whether or not there are established links in the web page for accessing other pages. If there are established links in the web page, then information of the number of the links is also included in the content that makes up the web page.

Data analyzer 104 analyzes the content that makes up the web page to ascertain whether or not the page length of the analyzed web page is a length requiring the screen to be scrolled when the web page is displayed on display unit 106, whether or not there are established links in the analyzed web page for accessing other pages, and how many links are established in the analyzed web page if there are established links in the analyzed web page.

After data analyzer 104 has analyzed the web page, channel transition controller 105 adjusts the timing to activate the Fast Dormancy function based on the results of the analysis by data analyzer 104 of the content that makes up the web page (step 202).

A process of analyzing content that makes up the web page and a process for controlling the timing to activate the Fast Dormancy function will be described in specific detail below with reference to FIGS. 5 through 7.

Figure 5:
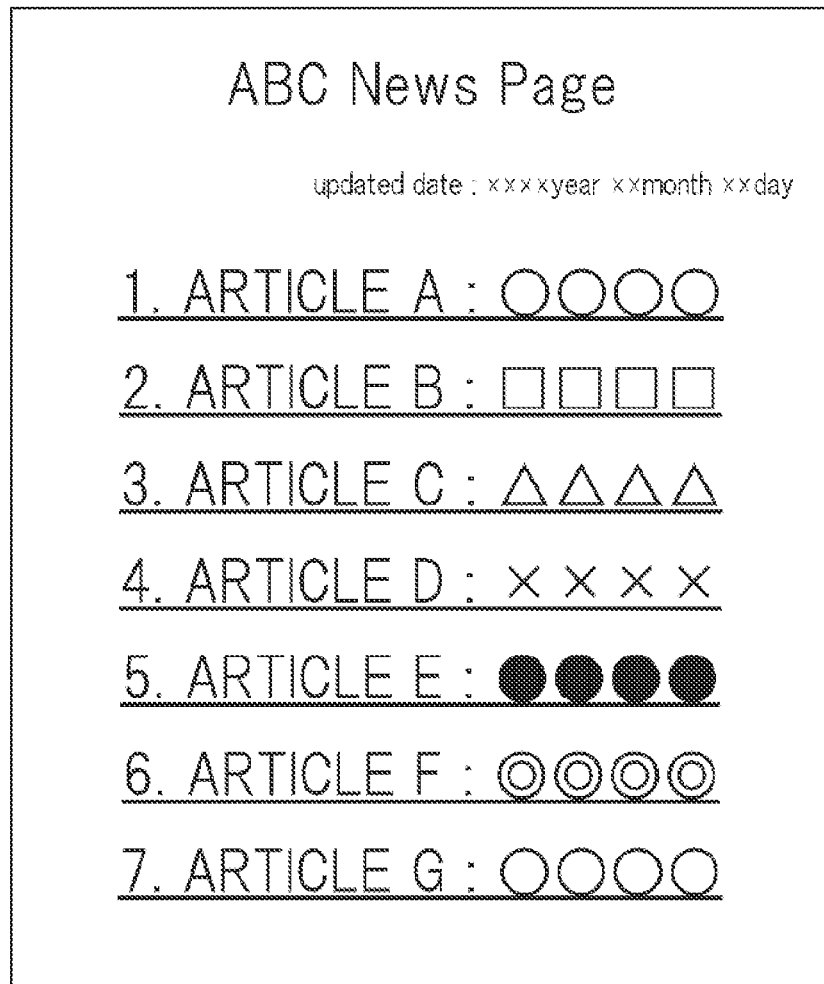
FIG. 5 is a view showing a home page by way of example.
Figure 6:
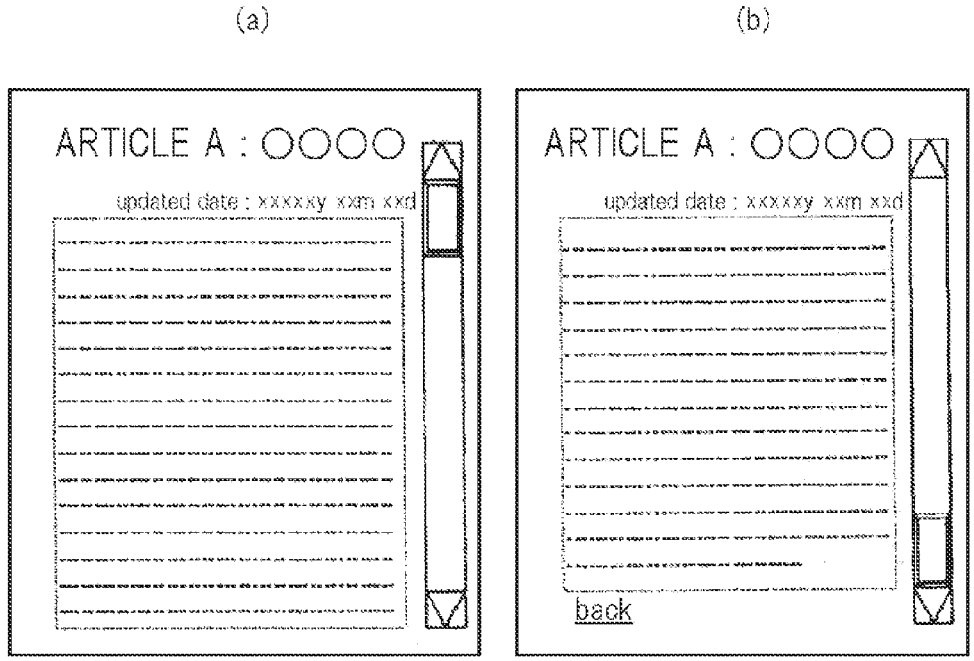
FIG. 6 is a view showing by way of example a first article linked to the home page.
Figure 7:
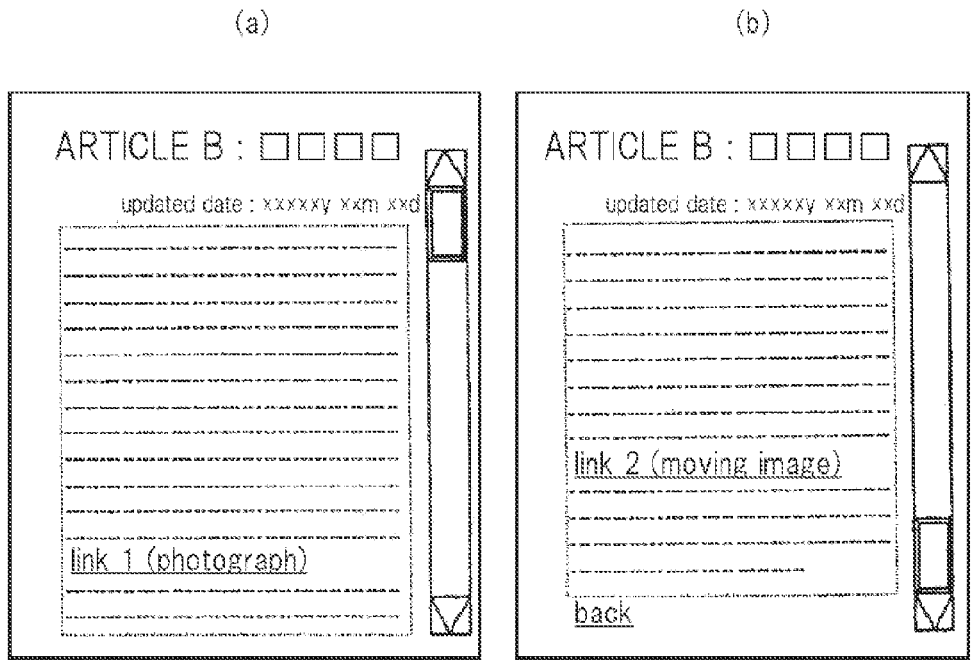
FIG. 7 is a view showing by way of example a second article linked to the home page.

FIGS. 5 through 7 are views showing examples of web pages that are received by the mobile terminal. FIG. 5 shows a home page by way of example which include seven links to "ARTICLE A" through "ARTICLE G". FIGS. 6 and 7 are views showing examples of web pages led from the links established in the home page shown in FIG. 5.

The web page shown in FIG. 6 represents a first article example of a long text having a page length so large that the full text cannot be displayed on display unit 106 of the mobile terminal unless the screen is scrolled. The first article example shown in FIG. 6 is a web page of article A linked from "ARTICLE A" shown in FIG. 5. FIG. 6(a) shows an upper end portion of article A, and FIG. 6(b) shows a lower end portion of article A.

FIG. 7 shows a web page which represents a second article example of a text having a page length so long that the full text cannot be displayed on display unit 106 of the mobile terminal unless the screen is scrolled, the text including links to other pages. The second article example shown in FIG. 7 is a web page of article B linked from "ARTICLE B" shown in FIG. 5. FIG. 7(a) shows an upper end portion of article B, and FIG. 7(b) shows a lower end portion of article B.

A home page is a type of web page, and is also called "top page" or "start page". According to the present exemplary embodiment, a home page is an example of web page having a large page length or an example of web page having many links established therein.

When the user operates operation unit 107 to enter a command for requesting the home page shown in FIG. 5, the mobile terminal exchanges control information according to a communication sequence with the base station to establish a packet call. When the mobile terminal receives the data of the home page shown in FIG. 5 from the server on the network, the mobile terminal displays a screen of the received home page data on display unit 106. At the same time, wireless communication controller 103 starts a timer process on the reference standby time, and data analyzer 104 analyzes the content that makes up the home page shown in FIG. 5. Data analyzer 104 sends a notice indicating that the image of the received home page data is of a page length short enough to be displayed as one screen on display unit 106 and that contains a plurality of links (seven links in the example shown in FIG. 5), to channel transition controller 105.

Figure 8:
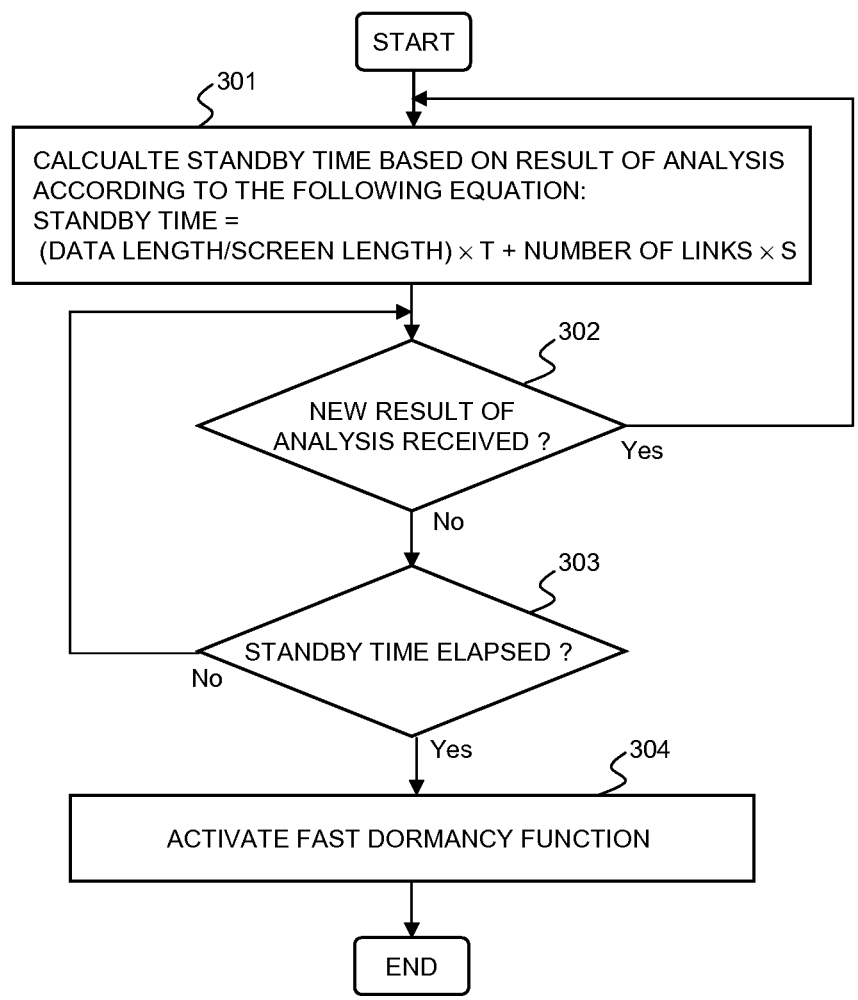
FIG. 8 is a flowchart of an operation sequence of a channel transition controller and a wireless communication controller shown in FIG. 3.

FIG. 8 is a flowchart of an operation sequence of channel transition controller 105 and wireless communication controller 103 shown in FIG. 3. Channel transition controller 105 produces settings in which a page length that is short enough to be displayed as one screen on display unit 106 serves as a unit page length, the standby time per unit page length is represented by T, and the standby time per link included in the web page is represented by S. T and S represent desired times and are set in channel transition controller 105 in advance. Based on the result of the analysis received from data analyzer 104, channel transition controller 105 sets a standby time (T+7S) for the received home page shown in FIG. 5 in wireless communication controller 103 (step 301).

The standby time (T+7S) is set because the home page shown in FIG. 5 has a page length that is short enough to be displayed as one screen on display unit 106 and the number of links is 7. The longer the length of the web page, the longer is the standby time because the longer page will require the user to spend more time reading the entire page and there is a possibility that the user will enter a command into the mobile terminal to request another page immediately after having read the entire page. The greater the number of established links, the longer is the standby time. This is because the greater the number of links, the higher is the possibility that the user will enter a command into the mobile terminal to request a page related to the links.

When wireless communication controller 103 receives information about the standby time from channel transition controller 105, wireless communication controller 103 starts a timer process on the standby time (T+7S), rather than the reference standby time (step 303). If the user operates operation unit 107 within the standby time (T+7S) to select another page, e.g., "ARTICLE A" or "ARTICLE B" shown in FIG. 5, and the mobile terminal acquires the web page shown in FIG. 6 or 7 (step 302), then wireless communication controller 103 stops the timer process on the standby time (T+7S), and starts a timer process on the standby time sent from channel transition controller 105 based on the result of the analysis of the next page by data analyzer 104.

If the user does not acquire another page, e.g., the web page shown in FIG. 6 or 7, within the standby time (T+7S), and the timer process on the standby time (T+7S) has expired, wireless communication controller 103 activates the Fast Dormancy function to bring wireless communication unit 101 into the IDLE mode (step 304). In this manner, a channel transition control process is performed on the mobile terminal.

The web page shown in FIG. 6 is of a page length which requires the screen to be scrolled because it covers two screens on display unit 106. However, since it includes only one link, the standby time for the web page shown in FIG. 6 is represented by (2T+S). The web page shown in FIG. 7 is of a page length covering two screens on display unit 106 and includes three links, so that the standby time for the web page shown in FIG. 6 is represented by (2T+3S). In this manner, when the mobile terminal acquires another web page, wireless communication controller 103 performs a timer process on the standby time determined based on the result of the analysis of the new web page irrespective of whether or not the standby time (T+7S) for the web page shown in FIG. 5 has elapsed.

According to the operation sequence shown in FIG. 8, the result of the analysis of a web page includes both information about the page length of the web page and information about the number of links established in the web page. However, the result of the analysis of the web page may include either one of the above two items of information.

The mobile terminal according to the present exemplary embodiment controls the timing to make a channel transition from the packet communication mode to the standby mode depending on content that makes up a received web page. If the possibility that the mobile terminal will continue the packet communications is low based on the content that makes up the web page, then the mobile terminal changes to the standby mode. If the possibility that the mobile terminal will continue the packet communications is high based on the content that makes up the web page, then the mobile terminal is kept in the packet communication mode. As a result, the mobile terminal is prevented from resuming packet communications immediately after the mobile terminal has changed from the packet communication mode to the standby mode, and hence has its electric power consumption reduced. Consequently, the electric power consumption of the mobile terminal is reduced while the frequency usage efficiency for communications between the base station and the mobile terminal is being maintained.

According to the present exemplary embodiment, the channel transition from the CELL-DCH mode to the IDLE mode has been described as a channel transition with respect to which the timing is to be controlled. However, the channel transition from the CELL-DCH mode to the CELL-FACH mode or the CELL-PCH mode may be a channel transition with respect to which the timing is to be controlled, or the channel transition between standby modes, or specifically, the channel transition from the standby mode, i.e., the CELL-FACH mode or the CELL-PCH mode, to the IDLE mode, may be a channel transition with respect to which the timing is to be controlled. The channel transition from the CELL-DCH mode to the IDLE mode is the most effective way to reduce the electric power consumption of the mobile terminal.

SECOND EXEMPLARY EMBODIMENT

According to a second exemplary embodiment, when the user operates the operation unit, the operation of the user becomes a trigger making a mobile terminal adjust the timing to activate the Fast Dormancy function, in addition to the functions of the first exemplary embodiment described above. The mobile terminal according to the present exemplary embodiment is identical to the mobile terminal according to the first exemplary embodiment, and hence will not be described in detail below except for features that are different from the first exemplary embodiment.

According to the present exemplary embodiment, channel transition controller 105 determines the standby time based on the result of the analysis sent from data analyzer 104, and thereafter changes the standby time depending on the content of the operation which the user has performed on operation unit 107.

The operation sequence of the mobile terminal according to the present exemplary embodiment will be described below with reference to FIG. 7. As described above in the first exemplary embodiment, data analyzer 104 analyzes the web page of the second article example shown in FIG. 7, and finds that the page length covers two screens on display unit 106 and that the web page contains three links. Based on the result of the analysis, channel transition controller 105 determines a standby time (2T+3S) for the web page of the second article example.

The web page shown in FIG. 7 may be used by the user in various ways.

Usually, it is customary for the user to browse the entire text of the web page and then to select one of the links therein to acquire the next page. However, even if the acquired web page is long and contains many links established therein, the user may find desired information on the web page. In this case, since the user does not request another page, there is no need to keep the mobile terminal in the CELL-DCH mode until the standby time (2T+3S) elapses. Because the user may want to take time to read the text of the web page, the user will operate operation unit 107 such that the screen is scrolled slowly.

Based on the content of the operation performed on operation unit 107, channel transition controller 105 judges that there is no need to keep the mobile terminal in the CELL-DCH mode, and sends a notice indicating that the standby time has changed to a time shorter than the standby time (2T+3S). The shorter time may be one-half of the standby time (2T+3S), for example. When wireless communication controller 103 receives the notice that the standby time has changed to ($\frac{1}{2}$)×(2T+3S) from channel transition controller 105, wireless communication controller 103 sets the standby time to ($\frac{1}{2}$)×(2T+3S) and controls the timing to activate the Fast Dormancy function.

Since the Fast Dormancy function is activated before the standby time determined based on the result of the analysis of the web page elapses, it is possible to reduce the electric power consumption for packet communications.

If the operation is performed on operation unit 107 to change the scrolling direction many times within a short period of time, then it is considered that the user may be contemplating which link from among a plurality of links, that have been established in the web page, is to be selected. If the mobile terminal is in the IDLE mode at the time one of the links is selected, the mobile terminal has to make a channel transition to the CELL-DCH mode, consuming more electric power than if the mobile terminal resumes packet communications with the base station from the CELL-DCH mode.

Therefore, from the content of the operation performed on operation unit 107, channel transition controller 105 decides that the mobile terminal needs to be kept in the CELL-DCH mode and sends a notice to wireless communication controller 103 indicating that the standby time will be changed to a longer time than (2T+3S). The longer time may be one and half times longer than the determined standby time (2T+3S), for example. When wireless communication controller 103 receives the notice from channel transition controller 105 indicating that the standby time will be changed to 1.5×(2T+3S), then wireless communication controller 103 sets the standby time to 1.5×(2T+3S), thereby controlling the timing to activate the Fast Dormancy function.

Consequently, if there is a high possibility that the user will request another web page, the mobile terminal will be kept in the CELL-DCH mode for a time longer than the standby time determined based on the result of the analysis, thereby minimizing the electric power consumption for packet communications.

The mobile terminal according to the present exemplary embodiment is capable of controlling the timing to activate the Fast Dormancy function in a better fashion than the mobile terminal according to the first exemplary embodiment by taking into account the content of the operation performed on operation unit by the user in addition to the result of the analysis performed by data analyzer.

According to the first and second exemplary embodiments described above, the mobile terminals have been described in detail with reference to FIG. 3 for an easier understanding of the present invention. In order to carry out the communication process according to the feature of the present invention, the mobile terminal may have at least the data analyzer, the channel transition controller, and the display unit among the components shown in FIG. 3.

According to the first and second exemplary embodiments described above, the control of the timing to activate the Fast Dormancy function has been described with respect to the mobile terminal which employs the W-CDMA communication process. However, the present information may be applied to controlling the timing to transit from the packet communication mode to the standby mode in a mobile terminal according to another communication process.

According to an exemplary advantage of the invention, it is possible to reduce the electric power consumption of a mobile terminal while maintaining frequency usage efficiency for communications between a base station and the mobile terminal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-251681 filed on Nov. 10, 2010, the content of which is incorporated by reference.

DESCRIPTION OF REFERENCE CHARACTERS

101 Wireless communication unit
102 Controller
103 Wireless communication controller
104 Data analyzer
105 Channel transition controller
106 Display unit
107 Operation unit

The invention claimed is:

1. A mobile terminal comprising:
a data analyzer configured to analyze content that makes up a web page received from a server connected to a network via a base station;
a display unit displaying said web page; and
a channel transition controller configured to adjust timing to transit to a standby mode which consumes smaller amount of electric power than in a present mode based on a result of the analysis made by said data analyzer;
wherein:
said data analyzer configured to have, as a target object to be analyzed, a length of a page at the time when said web page is displayed on said display unit and a number of links established in said web page;
said channel transition controller configured to determine a standby time which is the time when said web page is received to the time when said mobile terminal transits to said standby mode, based on information representing said length of said page, said number of links, a time per unit page length, and time per link; and
a wireless communication controller configured to activate fast dormancy function based on the standby time.

2. The mobile terminal according to claim 1, wherein:
said channel transition controller configured to control said standby time so that the longer said length of said page, the longer is said standby time; and
said channel transition controller configured to control said standby time so that the greater said number of links, the longer is said standby time.

3. The mobile terminal according to claim 2, further comprising:
an operation unit for a user to enter a command;
wherein said channel transition controller configured to change changes said standby time determined based on said result of the analysis made by said data analyzer, depending on content of an operation performed on said operation unit by said user.

4. The mobile terminal according to claim 1, further comprising:
an operation unit for a user to enter a command;
wherein said channel transition controller configured to change said standby time determined based on said result of the analysis made by said data analyzer, depending on content of an operation performed on said operation unit by said user.

5. A communication control method to be performed by a controller of a mobile terminal which includes a display unit, an operation unit, and said controller, comprising:
said controller analyzing content that makes up a web page received from a server connected to a network via a base station; and
said controller adjusting timing to transit to a standby mode which consumes a smaller amount of electric power than in a present mode based on a result of the analysis made by said controller,
wherein:
when said controller analyzes the content that makes up said web page, said controller has, as a target object to be analyzed, a length of a page at the time when said web page is displayed on said display unit and a number of links established in said web page;
said controller determines a standby time which is the time when said web page is received to the time when said mobile terminal transits to said standby mode, based on information representing said length of said page, said number of links, a time per unit page length, and time per link; and
said controller activates fast dormancy function based on the standby time.

6. The communication control method according to claim 5, wherein
said controller controls said standby time so that the longer said length of said page, the longer is said standby time, and said controller controls said standby time so that the greater said number of links, the longer is said standby time.

7. The communication control method according to claim 5, wherein said controller changes said standby time determined based on said result of the analysis, depending on content of an operation performed on said operation unit by a user.

8. The communication control method according to claim 6, wherein said controller changes said standby time determined based on said result of the analysis, depending on content of an operation performed on said operation unit by a user.

* * * * *